3,557,191
PRODUCTION OF VINYL ACETATE AND ACETIC ACID FROM ETHYLENE

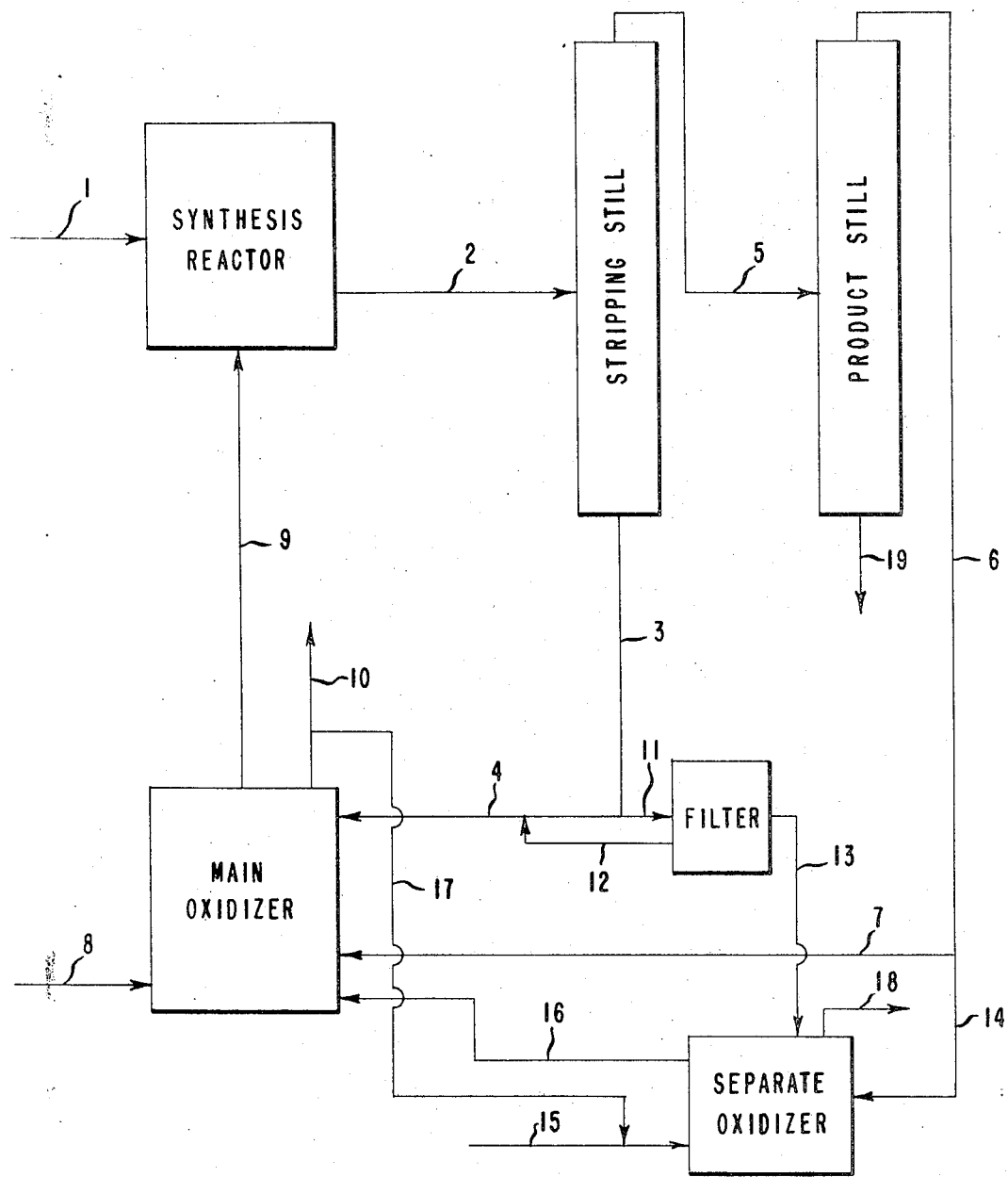

Harry B. Copelin, Niagara Falls, N.Y., assignor to E. I. du Pont de Nemours and Company, Wilmington, Del., a corporation of Delaware
Filed Feb. 17, 1964, Ser. No. 345,507
Int. Cl. C07c 67/04
U.S. Cl. 260—497   4 Claims

ABSTRACT OF THE DISCLOSURE

A two stage process for preparing vinyl acetate and acetic acid wherein ethylene is reacted with a working solution containing acetic acid, a palladium II salt, acetate ions, halide ions and a cupric salt to produce vinyl acetate and acetaldehyde and substantially all of the halide ions are precipitated as cuprous halide in the first stage and wherein the acetaldehyde is oxidized to acetic acid and the reduced working solution is reoxidized by contacting the reduced working solution which is substantially halide-free with the acetaldehyde therein with oxygen in the second stage.

---

This invention relates to a method of producing vinyl acetate, particularly both vinyl acetate and acetic acid, from ethylene.

It is known (Moiseev et al., Doklady Akad Nauk. SSSR. 133, 377 (1960)) that vinyl acetate can be produced by reacting ethylene with anhydrous acetic acid containing palladium chloride and sodium acetate. The acetic acid reaction medium preferably also contains an oxidizing agent, such as a quinone or a cupric salt whose purpose is to prevent reduction of the palladium salt to metallic palladium. A similar preparation of vinyl acetate is described in British patent 928,739.

The oxidizing agent, which becomes reduced during use, may be reoxidized in situ for continued use by means of oxygen supplied with the ethylene to the reaction medium (hereinafter called the "working solution"); or the reduced working solution may be regenerated for reuse by oxidation in a separate operation, as disclosed in Belgian patents 608,610 and 614,970, and in French patent 1,318,208.

The presence of water in the working solution during the reaction to produce vinyl acetate is known to cause formation of acetaldehyde as a by-product along with the vinyl acetate. Acetaldehyde has generally been regarded as an undesired by-product and the above references emphasize employing an anhydrous reaction medium or one from which water has been eliminated as much as possible, thereby to minimize acetaldehyde formation.

The reaction of ethylene and the ionizable metal acetate to produce vinyl acetate is catalyzed by the palladium II salt, probably through the intermediate formation of an ethylene-palladium II salt complex, e.g., $(C_2H_4 \cdot PdCl_2)_2$. When the ionizable acetate is cupric acetate, which would also function as the oxidizing agent, the reaction may be represented as follows:

(A) $C_2H_4 + 2Cu(OOCCH_3)_2 \rightarrow$
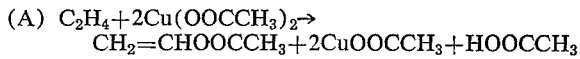
 $CH_2=CHOOCCH_3 + 2CuOOCCH_3 + HOOCCH_3$ The regeneration reaction by which the cuprous acetate product of reaction A is reoxidized to cupric acetate for reuse is as follows:

(B) $2CuOOCCH_3 + 2HOOCCH_3 + \frac{1}{2}O_2 \rightarrow$
$2Cu(OOCCH_3)_2 + H_2O$ The net or over-all reaction is:

(C) $C_2H_4 + HOOCCH_3 + \frac{1}{2}O_2 \rightarrow$
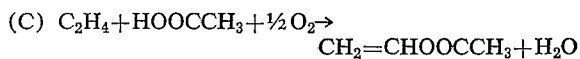
$CH_2=CHOOCCH_3 + H_2O$ from which it will be seen that one mole of acetic acid is consumed and one mole of water is formed for each mole of vinyl acetate produced in the cycle.

Acetic acid derived from any source may of course be employed to meet the requirements of the above over-all reaction. However, because of the cheapness of ethylene as a raw material, such a process for producing vinyl acetate would become much more attractive if the required acetic acid were also synthesized from ethylene, particularly if it could be synthesized in the same system used for making the vinyl acetate and employing the same working solution whereby investment and equipment costs would be minimized.

It is an object of the invention to provide a process for producing both vinyl acetate and acetic acid from ethylene. A particular object is to provide such a process wherein both vinyl acetate and acetic acid are produced from ethylene in the same system in which is employed an acetic acid working solution containing a palladium II salt, an ionizable metal acetate, a cupric salt oxidizing agent and water. Still further objects of the invention will be apparent from the following description.

The objects of the invention are attained by providing a reaction medium comprising an acetic acid solution of a palladium II salt catalyst, an ionizable metal acetate, a cupric salt oxidizing agent and a minor amount of water, e.g., 1 to 20%, based upon the weight of the solvent components of the working solution; contacting and reacting ethylene with the working solution under conditions whereby both vinyl acetate and acetaldehyde are formed and the working solution becomes at least partially reduced; separating vinyl acetate as product; reoxidizing the reduced working solution and simultaneously oxidizing the acetaldehyde therein to acetic acid; and recycling the reoxidized working solution with the acetic acid so-produced for reaction with further amounts of ethylene. By suitable choice of the conditions employed and particularly the water content of the working solution, the amount of acetic acid produced along with the vinyl acetate can be controlled so as to meet all or any desired part of the acetic acid requirements of the process.

The relative proportions of vinyl acetate and acetaldehyde produced are dependent upon various factors such as the water content of the working solution, temperature, ethylene pressure, the palladium II salt catalyst concentration and the time of contact of the vinyl acetate with the working solution. An increase of the ethylene pressure will increase vinyl acetate formation, while an increase of any of the other named factors will increase the formation of acetaldehyde. However, acetaldehyde formation will be influenced mostly by the water content of the working solution which will largely determine the amount of the aldehyde produced.

It seems certain that acetaldehyde is not formed by the direct oxidation of ethylene as is the case when ethylene is contacted with a water solution of a palladium salt and an oxidizing agent. (Smidt, Angewandte Chemie 71, 176–182 (1959)). The indications are that most of the acetaldehyde results from the hydrolysis of vinyl acetate according to the reaction:

(D) $CH_2=CHOOCCH_3 + H_2O \rightarrow CH_3CHO + HOOCCH_3$

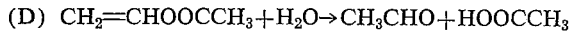

which reaction is catalyzed by the palladium II salt of the working solution. Minor amounts of acetaldehyde are probably also formed by the hydrolysis of by-products such as ethylidene diacetate, which is a known by-product of the reaction to produce vinyl acetate, and by the reaction of vinyl acetate and acetic acid in the presence of the palladium II salt and the ionizable metal acetate component of the working solution according to the following equation:

(E) $CH_2{=}CHOOCCH_3 + HOOCCH_3 \rightarrow CH_3CHO + (CH_3CO)_2O$

Acetaldehyde is oxidized to acetic acid according to the reaction:

(F) $CH_3CHO + \tfrac{1}{2}O_2 \rightarrow HOOCCH_3$

If the mole quantities for Equation C are doubled, the sum of that equation and Equations D and F becomes:

(G) $2C_2H_4 + \tfrac{3}{2}O_2 \rightarrow CH_2{=}CHOOCCH_3 + H_2O$ according to which ethylene is the source of both the alcohol and the acid portions of the vinyl acetate product. In order for the over-all operation to be balanced, i.e., not require acetic acid from another source, it is evident from Equations C, D and F that vinyl acetate and acetaldehyde should be produced in equimolar proportions. This assumes that all of the acetaldehyde intermediate will be formed according to Equation D and that all acetic acid formed will result from the reactions of Equations D and F. That assumption, although generally true and useful for discussion purposes, is not entirely correct in that minor amounts of acetaldehyde and acetic acid are probably produced by the reaction of Equation E and some acetaldehyde no doubt originates from the hydrolysis of by-products as indicated previously.

Since the water content of the working solution largely determines the amount of acetic acid and intermediate acetaldehyde produced, the water content should be controlled in accordance with the desired production of acetic acid. If the process is to be operated where by-product acetic acid from some other operation, e.g., the manufacture of polyvinyl alcohol from polyvinyl acetate, is available for supplying part of the acetic acid required, then only the remaining part need be produced in the vinyl acetate synthesis operation, and the water content of the working solution will be adjusted accordingly. In general, the water content will range from 1 to 20%, preferably, from 3 to 15%, based upon the weight of the solvent components of the working solution, e.g., based upon the combined contents of acetic acid and water when they are the only solvents present.

The critical part of the over-all operation insofar as the production of acetic acid is concerned is the oxidation of acetaldehyde to acetic acid according to reaction F. It has been found that the cupric salt component of the working solution is an excellent catalyst for that reaction in view of which the aldehyde can be efficiently oxidized to acetic acid in the working solution while the latter is being reoxidized or regenerated by reaction with oxygen for reuse in the vinyl acetate synthesis phase of the process.

The attached drawing is a schematic flow diagram of illustrative process operations for producing both vinyl acetate and acetic acid in accordance with the invention.

In one embodiment of the invention as illustrated in the drawing, ethylene is fed by way of line 1 to the synthesis reactor, wherein it is contacted and reacted with agitated working solution to produce both vinyl acetate and acetaldehyde and the working solution becomes at least partially reduced. The reduced working solution containing the vinyl acetate and aldehyde is then passed through line 2 to the stripper still where the solution is stripped of vinyl acetate and acetaldehyde which are removed as overhead products and pass via line 5 to the product still where they are separated by fractionation. The vinyl acetate bottom product is removed from the latter still via line 19 while the acetaldehyde fraction is removed overhead. The stripped reduced working solution from the bottom of the stripping still is passed via lines 3 and 4 to the main oxidizer wherein it is contacted with oxygen, e.g., air, supplied via line 8, and thereby reconverted to its oxidized state. The reoxidized working solution is finally recycled via line 9 to the synthesis reactor for reuse.

The acetaldehyde overhead fraction from the product still is passed by way of lines 6 and 7 to the main oxidizer in which the acetaldehyde is oxidized to acetic acid simultaneously with the reoxidation of the working solution. When such oxidations are effected using air, unused air and nitrogen are vented via line 10. The acetic acid and any unconverted acetaldehyde flow via line 9 to the synthesis reactor along with the reoxidized working solution.

Since halide ion tends to inhibit catalysis of the oxidation of acetaldehyde to acetic acid by cupric ions, it is preferred to effect conversion of at least a major part of the aldehyde to acetic acid in working solution which is substantially free of halide, e.g., chloride, ion while carrying out the vinyl acetate synthesis in working solution containing a substantial concentration of halide ion whose presence there is generally beneficial. This can be readily accomplished in accordance with another embodiment of the invention illustrated in the drawing by employing in the synthesis reactor working solution containing halide ion at a concentration relatively low with respect to the cupric ion concentration and sufficiently low so that substantially all halide ion will be precipitated as cuprous chloride as cupric ion becomes reduced. Part of the stripped reduced working solution from the stripper still is passed to the main oxidizer via lines 3 and 4 while the remainder is fed via lines 3 and 11 to the filter from which filtrate essentially free of chloride ion is passed to the separate oxidizer via line 13. The chloride-free working solution is mixed in the latter with acetaldehyde fed via lines 6 and 14. Oxidation of the aldehyde and the working solution occurs simultaneously in the separate oxidizer by means of oxygen or air introduced via line 15 with the off-gas being vented from line 18. The resulting mixture is passed via line 16 to the main oxidizer where it is mixed with the stream of unfiltered reduced working solution fed by way of lines 3 and 4. Cuprous chloride separated by the filter from the working solution fed to the separate oxidizer is passed, e.g., as a slurry, via line 12 into line 4 and thence to the main oxidizer. As previously indicated materials fed to the main oxidizer are oxidized by oxygen fed via line 8 and then returned to the synthesis reactor by way of line 9. When air is fed via line 8 to the main oxidizer, the oxygen-poor off-gas can be vented via line 10, or it can be passed via lines 17 and 15 to the separate oxidizer and there employed as the oxidizing gas. The use of such oxygen-poor off-gas from the main oxidizer in the separate oxidizer makes safer the charging of acetaldehyde to the latter.

Instead of stripping all of the vinyl acetate product from the working solution in the stripping still, as indicated by the drawing, the stripping operation can be effected so as to leave any desired part of the vinyl acetate in the working solution. Any such vinyl acetate left in the working solution will of course be continuously subjected to the hydrolytic action of the working solution as it progresses through the oxidizer, and the acetaldehyde resulting from the hydrolysis will be simultaneously subjected to the oxidizing action of the air fed to the oxidizer. Thus, one way of increasing the amount of acetaldehyde produced and converted to acetic acid is to leave some predetermined portion of the vinyl acetate in the working solution removed from the stripping still. Also, when employing the separate oxidizer as described above the oxidized mixture therefrom and the reoxidized working solution from the main oxidizer can, if desired, be recycled separately to the main oxidizer.

The operations indicated by the drawing are carried out continuously. The synthesis reactor may be a single-stage back-mixing reactor, a multi-stage back-mixing reactor, a pipeline or tower reactor, or any other type of reactor for contacting and reacting a gas with a liquid. The stripping still and fractionating still can be of any desired design to accomplish, respectively, the stripping of the volatile reaction products from the working solution and the separation thereof to give an acetaldehyde fraction for oxidation in the oxidizer. The filter, which can be of any desired design, can be replaced for example by a centrifuge or by a settling tank with provision for drawing off supernatant liquid therefrom to line 13 and provision for passing settled slurry to line 4. The entire system will of course include pumps and valves, or other equivalent means, where necessary, neither of which is indicated in the drawing. Although not indicated in the drawing, the working solution effluent from the synthesis reactor will generally be degased to free it of unreacted ethylene (which may be recycled) before it is passed to the stripping still.

The synthesis reactor will be operated under an ethylene pressure of 50 to 2000 p.s.i.g., preferably 100 to 500 p.s.i.g., and at a temperature of 50 to 160° C., preferably 80 to 130° C. The reactor will desirably be provided with an agitator to maintain solids in suspension and facilitate solubilization of the ethylene.

The conditions under which the oxidizer (either the main oxidizer, the separate oxidizer, or both) is operated are not critical except for their influence on the rates of the oxidation reactions. Temperatures of 50 to 150° C. are generally satisfactory, although yields tend to suffer somewhat at the higher end of this temperature range. The preferred temperatures range from 80 to 130° C. The oxidation can be carried out employing oxygen gas, but the use of air is preferred. Oxygen partial pressures of from 0.01 to 2 atomspheres are generally suitable and when using air, operation with the system under pressure so as to give oxygen partial pressures within the above range is desirable. Whether using oxygen gas, oxygen-enriched air, or air, the preferred oxygen partial pressures range from 0.1 to 1 atmosphere. The oxidizer may be of any desired design adapted to facilitate contact and reaction of a gas with a liquid, adequate agitation being important to ensure a reasonable rate of solution of the oxygen reactant in the working solution. Preferably, the oxidizer will be provided with a device such as a vaned disc agitator for effecting back-mixing of the working solution.

Suitable palladium II salts for use in the working solution are the chloride ($PdCl_2$), the bromide ($PdBr_2$) and the acetate; and the alkali metal chloro- and bromopalladites such as potassium chloropalladite ($K_2PdCl_4$) and lithium chloropalladite ($Li_2PdCl_4$). Use of the palladous halide, $PdCl_2$ or $PdBr_2$, in the form of an alkali metal halopalladite, e.g., $Li_2PdCl_4$, is generally preferred. The palladium II salt, the important part of which is the Pd II portion thereof, should be soluble in the working solution in an amount to provide a dissolved palladium II salt concentration of 0.001 to 0.1 mole or higher, preferably 0.003 to 0.03 mole, per liter. The palladium II salt can be charged to the working solution as one of the salts named above; or palladium metal, its oxide or carbonate may be charged and dissolved in the working solution.

The ionizable metal acetate is preferably charged to the working solution as cupric acetate or as an alkali metal acetate; although acetates of the alkaline earth metals and magnesium can be used, as can also ferric, stannic, nickel and cobalt acetates. The metal acetates can be formed by reaction of the oxide, hydroxide or carbonate of the indicated metals with the acetic acid component of the working solution. The metal acetate concentration in the working solution should be at least 0.01 molar, e.g., 0.01 to 1 molar; preferably, it will be at least 0.1 molar, e.g., 0.1 to 0.5 molar. Concentrations exceeding the solubility of the metal acetate in the working solution can be used. Metal acetate concentrations exceeding about 1 molar afford no particular added advantage, except when using cupric acetate, as is preferred, in which case, concentrations as high as 2.5 molar are advantageous for reasons explained below. At the higher of such cupric acetate concentrations, part of the cupric acetate will not dissolve and the initial mixture will be a slurry. However, as the reaction proceeds, the cupric acetate in solution is reduced to the cuprous salt and more of the cupric acetate dissolves. If chloride ion is also present, the reduced copper ion will precipitate as cuprous chloride and, therefore, the working solution, when employing a high concentration of copper compound will generally be a slurry whose solid phase will be either cupric acetate, cuprous chloride or a mixture of both.

The presence of chloride or bromide ion in the working solution during the vinyl acetate synthesis stage is distinctly beneficial. Such chloride or bromide ion is conveniently supplied as the chloride or bromide of any of the metals whose acetates have been indicated above, the preferred sources being the alkali metal and magnesium chlorides and bromides, particularly lithium and magnesium chlorides. The presence of such chloride or bromide is not essential, but concentrations, calculated as the halide ion, e.g. $Cl^-$, of 0.05 to 0.85 mole per liter are beneficial in accelerating the rate of reaction A. Higher concentrations, e.g., 0.9 molar or higher, are usable though distinctly not preferred in that they result in excessive formation of glycol acetates, particularly when the metal acetate is also present at a high concentration. The preferred halide ion concentrations are 0.2 to 0.6 molar.

The oxidizing agent of the working solution is a cupric salt such as the chloride, the bromide or the acetate. The cupric salt will generally be charged to the working solution to provide a concentration therein of from 0.05 to 2.5 moles per liter. The preferred concentrations are 1 to 1.5 molar. A high cupric salt content is desirable to provide a working solution of high synthesis capacity per cycle. As explained previously, the amount of cupric salt charged may exceed its solubility, but the amount charged should not be so great as to result in a slurry which cannot be effectively agitated or transported, e.g., by pumping. The preferred cupric salt is cupric acetate. The chloride or bromide can be used but the amount thereof, if used, generally should be restricted in keeping with the preference for the use of working solutions containing not more than 0.85 mole of halide ion per liter. It is most preferred that the cupric salt be employed as the acetate and that the chloride ion be supplied as lithium or magnesium chloride.

The acetic acid component of the working solution, which functions both as a solvent and as a reactant, most generally will comprise 80 to 99%, preferably 85 to 97%, of the weight of the solvent, with the balance being essentially water. However, up to as much as 99% of the acetic acid may be replaced by other solvents, provided they are miscible with acetic acid and water, are solvents for ethylene and are inert towards ethylene, the components of the working solution and the reaction products under the conditions of use. Illustrative of such other solvents are the saturated, unsubstituted aliphatic nitriles, including the mononitriles of 2 to 8 carbon atoms, such as acetonitrile, propionitrile, butyronitrile and valeronitrile, and the dinitriles of 3 to 12 carbon atoms, such as adiponitrile and sebaconitrile. When using such a nitrile as a partial replacement of the acetic acid, it is preferred that the weight ratio of nitrile to acetic acid be in the range of from 40:60 to 80:20.

The invention is illustrated by the following examples. In the examples and throughout the specification, all composition percentages are by weight.

EXAMPLE 1

Acetic acid, 400 g., and cupric acetate, 70 g., were charged to a flask fitted with an efficient agitator and a gas inlet. A Dry Ice cooled reflux condenser was added to prevent loss of acetaldehyde. Approximately 17 grams of acetaldehyde was then added, the reaction mixture was heated, and oxygen blown through. The aldehyde consumed was oxidized to acetic acid and the reaction mixture was analyzed periodically to determine its residual acetaldehyde content. The results obtained were as follows:

| | Temperature, °C. | Acetaldehyde content of mixture, percent |
|---|---|---|
| Time, minutes: | | |
| 0 | 65 | 3.68 |
| 10 | 70-75 | 2.08 |
| 20 | 75-80 | 1.24 |
| 30 | 80-85 | 0.48 |

The above results show that the oxidation of acetaldehyde to acetic acid proceeds readily in an acetic acid/cupric acetate reaction medium.

EXAMPLE 2

Additional acetaldehyde and 4 grams of lithium chloride were added to the final reaction mixture of Example 1, and the oxidation was continued as in that example with the temperature being maintained at 70° C. In thirty minutes, the acetaldehyde content fell from 1.67% to 0.85%. This shows that while acetaldehyde is still oxidized in the presence of chloride ion, the rate is much slower.

EXAMPLE 3

Additional acetaldehyde was added to the above reaction mixture and also 4 grams of lithium acetate dihydrate. The oxidation was run at 75° C. In thirty minutes, the acetaldehyde content was reduced from 4.0% to 1.9%. This shows that lithium acetate has little effect on the oxidation rate.

EXAMPLE 4

A mixture of propionitrile, 200 grams, cupric acetate, 20 grams, potassium chloropalladite ($K_2PdCl_4$), 0.2 g., and acetaldehyde, 4 g., was heated to 70° C. and oxygen passed over the surface with good agitation. In one hour, an 80% conversion of the acetaldehyde to acetic acid was indicated by Vapor Phase Chromatography scans. Another 8 grams of acetaldehyde was added and the oxidation continued at 70-85° C. In 70 minutes, the total conversion of aldehyde to acetic acid was 90%. This test shows that use of a nitrile solvent does not interfere with the process and that the oxidation proceeds normally in the presence of the palladium salt.

EXAMPLE 5

A sample of reduced working solution from a synthesis reaction for the conversion of ethylene to vinyl acetate and from which volatile reaction products had been stripped was filtered and 130 grams of the filtrate was charged to a titanium-lined bomb. Twenty grams of acetaldehyde were then added. The bomb was sealed and the temperature raised to 120° C. at which point the pressure was 40 p.s.i.g. Oxygen was slowly bled into the bomb with agitation until a 5 lb. increase in pressure was observed. Additional oxygen was added as necessary to maintain a 5 to 7 lb. partial pressure of oxygen in the system. After one hour, the bomb was cooled, vented, and the contents weighed and analyzed.

Initial charge: G.
Acetic acid _____ 122
Cuprous acetate _____ 5
Lithium acetate _____ 2.8
Palladium acetate _____ 0.2
Acetaldehyde _____ 20

Final charge:
Acetic acid _____ 133
Cupric acetate _____ 7
Lithium acetate _____ 2.8
Palladium acetate _____ 0.2
Acetaldehyde _____ 10

This experiment shows that acetaldehyde is oxidized to acetic acid when using working solution as catalyst. The increase in acetic acid content including that consumed in converting cuprous acetate to cupric acetate represents a substantially quantitative conversion of the aldehyde consumed to acetic acid. Since the rates of oxidation of both the cuprous acetate and acetaldehyde are directly proportional to the oxygen pressure, both oxidations can be effected at high rates by suitably increasing the oxygen pressure.

EXAMPLE 6

A sample of oxidized working solution was prepared from the following:
G.
Acetic acid _____ 850
$Li_2PdCl_4$ _____ 0.87
Cupric acetate _____ 44
Lithium acetate _____ 9

To this was added 17 grams of lights (acetaldehyde fraction) obtained by the fractional distillation of a composite sample of crude vinyl acetate prepared by a number of batches in which vinyl acetate was made from ethylene. The temperature was raised to 85° C. and oxygen blown through. Analysis of the solution at intervals showed the following:

Time, min.: Acetaldehyde content percent
0 _____ 2.00
15 _____ 1.69
30 _____ 1.42
45 _____ 1.25
60 _____ 1.09

This test demonstrates the use of acetaldehyde from the lights fraction as feed for the oxidation to acetic acid.

EXAMPLE 7

A series of reactions of ethylene with cupric acetate were made to demonstrate the effect of water concentration on acetaldehyde formation. In all tests, the working solution charge was:
G.
Acetic acid _____ 100
Cupric acetate monohydrate _____ 30
Lithium acetate dihydrate _____ 1
$Li_2PdCl_4$ _____ 0.25
LiCl _____ 1

The operating temperature was 75 to 80° C., the ethylene pressure was 300 p.s.i.g. and the time was 15 minutes. The results obtained are as follows:

| | Mole conversion based upon ethylene consumed | | |
|---|---|---|---|
| Water present, grams | To acetaldehyde, percent | To vinyl acetate, percent | Mole ratio, vinyl acetate/acetaldehyde |
| 3 | 5.1 | 75.0 | 14 |
| 6 | 13.6 | 88.3 | 6.5 |
| 9 | 15.7 | 59.3 | 3.8 |
| 12 | 18.9 | 70.0 | 3.7 |

Although somewhat erratic, this data give an indication of the relationship between the water content of the working solution and the ratio of vinyl acetate:acetaldehyde in the product.

EXAMPLE 8

Ethylene was reacted with a working solution charge of:
G.
Acetic acid _____ 83
Water _____ 17.1
Cupric acetate monohydrate _____ 30
Lithium acetate monohydrate _____ 1
LiCl _____ 2
$Li_2PdCl_4$ _____ 0.25

The water content (including the water of hydration of the monohydrate salts) was 19.6% based upon the combined weights of acetic acid and water. The operating temperature was 95 to 100° C., the ethylene pressure was 200 to 300 p.s.i.g. and the time was 15 minutes. Vinyl acetate and acetaldehyde were produced in substantially equimolar proportions.

Since water is a by-product of the cyclic process, removal of water in controlled amounts from the working solution at one or more points in the cycle is necessary in order to maintain the water content of the working solution at the desired level. Water removal is most conveniently accomplished by operating the stripping still and product still of the system indicated by the drawing so as to separate the water to be removed as a water fraction which is discarded. Minor amounts of water will of course be removed as water vapor by the gases vented from pipe 10 or 18. Water can also be removed if desired from any other point in the cycle, e.g., between the main oxidizer and the synthesis reactor, by conventional stripping methods or by the use of dehydrating agents.

The embodiments of the invention in which an exclusive property or privilege is claimed are as follows:

1. In a method for producing vinyl acetate by the reaction of ethylene with an acetic acid working solution of a palladium II salt, an ionizable metal acetate and a cupric salt oxidizing agent, said solution also containing halide ions from the group consisting of chloride and bromide ions, the improvement comprising the following steps:
  (a) reacting ethylene with such a working solution which contains halide ions at a concentration relatively low with respect to the concentration of cupric ions present and 1 to 20% by weight of water, based upon the weight of the solvent components of the working solution, whereby both vinyl acetate and acetaldehyde are produced and the working solution is at least partially reduced with precipitation of substantially all of said halide ions as cuprous halide;
  (b) separating at least part of the vinyl acetate from the reduced working solution as product;
  (c) separating said reduced working solution into a first portion containing substantially all of said precipitated cuprous halide and a second portion essentially free of halide ions;
  (d) simultaneously reoxidizing said second portion of the working solution and oxidizing said acetaldehyde to acetic acid by contacting and reacting said second portion of the working solution with said acetaldehyde therein with oxygen and recycling the resulting oxidized mixture to step (a); and
  (e) reoxidizing said first portion of the working solution by contacting the same with oxygen and recycling the resulting mixture to step (a).

2. The method of claim 1 wherein the mixture resulting from step (d) is mixed with said first portion of the working solution and the resulting mixture is reoxidized by contact with oxygen, then recycled to step (a).

3. The method of producing vinyl acetate from ethylene by the over-all reaction:

$$2C_2H_4 + \tfrac{3}{2}O_2 \rightarrow CH_2=CHOOCCH_3 + H_2O$$

said method comprising the steps of:
  (a) reacting (1) an acetic acid working solution of a palladium II salt at a concentration of 0.001 to 0.1 molar, cupric acetate at a concentration of 1 to 1.5 molar, halide ions of the group consisting of chloride and bromide ions at a concentration of 0.05 to 0.85 molar and water at a concentration of 1 to 20%, based upon the weight of the solvent components of the working solution, with (2) ethylene at an ethylene pressure of 50 to 2000 p.s.i.g., and at a temperature of 50 to 160° C., whereby said working solution is at least partially reduced with precipitation of substantially all of said halide ions as cuprous halide, and both vinyl acetate and acetaldehyde are produced;
  (b) recovering as product the vinyl acetate produced in step (a);
  (c) oxidizing the acetaldehyde produced in step (a) to acetic acid and reoxidizing said reduced working solution by contacting said reduced working solution in the substantial absence of halide ion and with said acetaldehyde therein with oxygen at a temperature of 50 to 150° C. and an oxygen partial pressure of 0.1 to 1 atmosphere; and
  (d) recycling to step (a) the reoxidized working solution resulting from step (c) including the acetic acid formed by the oxidation of acetaldehyde in said step (c).

4. The method of claim 3 wherein the water content of the working solution in step (a) is 3 to 15%, based upon the weight of the solvent components of the working solution.

References Cited

UNITED STATES PATENTS

| | | | |
|---|---|---|---|
| 1,951,789 | 3/1934 | Mueller-Cunradi | 260—530 |
| 1,982,559 | 11/1934 | Wiesler | 260—530 |
| 2,009,838 | 7/1935 | Foster | 260—530 |
| 3,277,158 | 10/1966 | Schaeffer | 260—497 |
| 3,450,748 | 6/1969 | Schaeffer | 260—497 |

FOREIGN PATENTS

| | | | |
|---|---|---|---|
| 145,569 | 5/1962 | U.S.S.R. | 260—497 |
| 608,610 | 3/1962 | Belgium | 260—497 |
| 964,001 | 7/1964 | Great Britain | 260—497 |

LORRAINE A. WEINBERGER, Primary Examiner

V. GARNER, Assistant Examiner

U.S. Cl. X.R.

252—416; 260—530, 533, 541, 601, 604